United States Patent [19]

Barenberg et al.

[11] Patent Number: 5,362,776

[45] Date of Patent: Nov. 8, 1994

[54] RECYCLABLE CELLULOSIC PACKAGING MATERIAL

[75] Inventors: Sumner A. Barenberg, Chicago, Ill.; C. Bruce Bradley, Miramar, Fla.; Gladys R. Vargas, Chicago, Ill.; Samuel C. Conway, Jr., Pine Bluff, Ark.

[73] Assignee: Packaging Corporation of America, Evanston, Ill.

[21] Appl. No.: 95,275

[22] Filed: Jul. 21, 1993

[51] Int. Cl.$^5$ .......................... C08L 1/00; C08K 5/12; B65D 81/02; B65D 85/30
[52] U.S. Cl. ..................................... 524/35; 524/312; 206/584; 206/814; 106/163.1; 106/171; 428/35.6; 523/124
[58] Field of Search .......................... 524/34, 35, 312; 206/584, 814; 106/163.1, 171; 428/35.6, 35.7, 393; 523/124

[56] References Cited

U.S. PATENT DOCUMENTS

| | | | |
|---|---|---|---|
| 4,863,655 | 9/1989 | Lacourse et al. | 264/53 |
| 4,997,091 | 3/1991 | McCrea | 206/584 |
| 5,151,312 | 9/1992 | Boeri | 428/156 |

FOREIGN PATENT DOCUMENTS 9117932  11/1991  WIPO ................. 206/584

Primary Examiner—Paul R. Michl
Assistant Examiner—LaVonda R. DeWitt
Attorney, Agent, or Firm—Arnold, White & Durkee

[57] ABSTRACT

A packaging material composed of cellulosic fiber, a softener, water, and, optionally, a water soluble binder. The biodegradable packaging material is prepared by a process of admixing cellulosic fiber, a softener, water and, optionally, a water soluble binder to form a slurry, and admixing a blowing agent with the slurry to form a pulp. The pulp is formed into a shaped material and dried.

9 Claims, No Drawings

RECYCLABLE CELLULOSIC PACKAGING MATERIAL

BACKGROUND OF THE INVENTION

1. Field of the Invention

The present invention relates generally to biodegradable, recyclable packaging materials. More specifically, the present invention relates to packaging materials formed from cellulosic waste materials.

2. Description of the Prior Art

Packaging materials are widely used industrially and domestically to cushion products ranging from delicate equipment to office supplies to prevent damage to the products during shipment and handling. Suitable packaging materials are often composed of an expanded foam providing a low density, flexible packaging that protects a product from damage without adding significantly to the weight of the product when shipped. Although conventional expanded foam materials adequately cushion a product, disposal of the materials is difficult because they may not be biodegradable or recyclable.

Several problems are associated with conventional packaging materials, such as expanded polystyrene peanuts. Safety problems arise during manufacture because the peanuts are formed from styrene monomer which is hazardous to workers if inhaled or ingested. The packing peanuts also accumulate static charges that cause them to stick to a product when the peanuts are closely packed about the product within a shipping carton. Another disadvantage associated with the polystyrene peanuts arises when the packaged product is a breakable container filled with a solvent, solution or other liquid. If the container breaks during shipment or is not sealed properly, the liquid will leak throughout the shipping carton. Polystyrene peanuts do not absorb the liquid to minimize such leakage, and often shrink considerably when exposed to liquid, losing their cushioning effect. Furthermore, the nonbiodegradable peanuts are often discarded after use, adding to existing landfill waste disposal problems.

Expanded vermiculite is an alternative packaging material which is suitable for packaging glass containers filled with liquid because it is moisture absorbent. Vermiculite, however, includes fines which adhere to glass and plastic. The fines can contaminate solvents and damage electronic equipment when the fines remain on the products after being unpackaged. Although a product may be sealed with a packaging film, the fines often stick to the product as it is being removed from the film. Vermiculite is also environmentally harmful because it is not biodegradable and cannot be recycled.

Starch based formulations have also been used to prepare biodegradable packaging materials. Starch based peanuts, however, may also be unsuitable for packaging breakable containers because they may dissolve in the presence of liquid which may leak from the containers. Starch based products also tend to become tacky when exposed to conditions of high humidity which may exist upon shipping and handling of a product.

Recycled newspaper has been used to form a biodegradable, recyclable packaging material. These materials, formed from aqueous slurries of chopped newspapers, are molded into thin hollow walled shells or are extruded as pellets. Although these materials employ waste paper materials, they have several drawbacks. Such packaging materials do not have the cushioning properties and low density provided by expanded foam materials. The materials also require a significant amount of storage space before they are reused or transported for recycling.

There exists a need for a packaging peanut which overcomes the disadvantages associated with conventional packaging materials. The present invention provides such an improved packaging material.

SUMMARY OF THE INVENTION

In accordance with the foregoing, it is an object of the present invention to provide a biodegradable, recyclable packaging material having cellulosic waste content for cushioning a packaged product to prevent damage to it during shipment and handling.

It is a related object to provide an improved packaging material capable of dispersing in water with agitation for convenient disposal of the material after use.

Yet another object of the present invention is to provide a moisture absorbent packaging material to minimize leakage of liquids from containers which break during transit.

The above and other objects are realized, in accordance with the system of this invention, by providing a biodegradable packaging material composed of cellulosic fiber, a softener, water, and, optionally, a water soluble binder. Glycerin is a preferred softener. Proteins and water soluble polymers such as polyvinyl alcohol, gelatin, cornstarch, polyethylene glycol, polyethylene oxide and soy proteins are suitable binders for purposes of the present invention.

The biodegradable packaging material of the present invention is prepared by a process of admixing cellulosic fiber, softener and water to form a slurry, and admixing a blowing agent with the slurry to form a pulp. The slurry can also include a water soluble binder. The pulp is formed into a shaped material and dried. The pulp is composed of from about 4 to about 15 wt. % cellulosic fiber, from about 2 to about 8 wt. % softener, from about 0.5 to about 8.5 wt. % blowing agent, water, and, optionally, from about 0.05 to about 3 wt. % water soluble binder. Ammonium bicarbonate and ammonium carbonate are suitable blowing agents for purposes of the present invention.

Another aspect of the invention is a method of making biodegradable packaging material by admixing cellulosic fiber, a softener, a water soluble binder and water to form a slurry, forming the slurry into a shaped material and drying the material.

DESCRIPTION OF THE PREFERRED EMBODIMENTS

The present invention provides a packaging material composed of cellulosic waste material to provide a low cost, biodegradable, recyclable product capable of insulating packaged goods from vibration and shock. The packaging material is moisture absorbent such that liquids leaking within a packaged container are absorbed. Moreover, the packaging material disperses in water with agitation for easy recycling.

The packaging material of the present invention contains cellulosic fiber, a softener, water and, optionally, a water soluble binder. In one embodiment of the invention, the packaging product includes from about 40 to about 85 wt. % cellulosic fiber, from about 10 to about 50 wt. % softener, and from about 3 to about 20 wt. % water. Preferably, the packaging material is formed from about 45 to about 60 wt. % cellulosic fiber, from about 25 to about 45 wt. % softener, and from about 5 to about 15 wt. % water.

In another embodiment of the invention, the packaging product also includes a water soluble binder. The packing material contains from about 40 to about 85 wt. % cellulosic fiber, from about 10 to about 50 wt. % softener, from about 3 to about 20 wt. % water, and from about 0.5 to about 20 wt. % water soluble binder. Preferably, the packaging material is formed from about 45 to about 60 wt. % cellulosic fiber, from about 25 to about 45 wt. % softener, from about 5 to about 15 wt. % water, and from about 1 to about 15 wt. % water soluble binder.

The cellulosic fiber used in making the packaging material is preferably any post consumer waste paper or waste fiber including newsprint, corrugated containers, magazines and office waste paper, or other fiber source such as paper mill sludge. Utilization of these waste materials prevents the need for disposing of such waste by incineration or landfill disposal. Because of the low cost of paper waste, the amount of fiber in the packaging product is preferably maximized. In a preferred embodiment, the fiber is provided in the form of an aqueous fiber slurry having a consistency of 15 to 20 wt. % solids. In order to provide the packaging material with suitable tensile and bending strength, a portion of the fibers is preferably longer than the remainder of the fibers.

A softener such as glycerin for the cellulosic fiber is an essential ingredient of the packaging material formulation. When ethylene glycol or propylene glycol is substituted for glycerin, the resultant packaging material exhibits inferior flexibility.

A water soluble binder is preferably a component of the packaging material. In addition to effectively binding the material, the binder imparts flexibility to the packaging product and reduces the drying time required to dry the product after forming. A wide range of water soluble resins such as proteins and polymers may be used. Cornstarch, polyethylene glycol, polyethylene oxide, polyvinyl alcohol, gelatin and soy proteins are acceptable binders which enable the packaging material to be dispersed in water for recycling after use.

Gelatin, polyvinyl alcohol, or warm water soluble resins are preferred binders because they provide a packaging material which is dispersable in warm water with agitation while retaining integrity in water at room temperature. This is particularly advantageous when the material is used to package a liquid product held in a breakable container. The packaging material will not disperse if the liquid leaks from the container but will absorb the liquid up to its absorptive capacity to minimize leakage from the shipping carton. Gelatin is used as a preferred binder because it is cost effective, reduces drying time and provides a flexible product.

If a sufficient amount of a blowing agent is used in forming the packaging material, the binder may be eliminated from the formulation. Ammonium bicarbonate or ammonium carbonate is an effective blowing agent for the purposes of the present invention. Heat applied to the packaging material after forming causes the blowing agent to decompose, releasing carbon dioxide and ammonia. The release of these gases from the material causes the material to expand to form a puffed configuration which provides good cushioning properties. Accordingly, the puffiness of the material increases when a greater amount of blowing agent is used to form the packaging material. Packaging having reduced puffiness is formed using a lesser amount of the blowing agent to provide a more cost effective, commercially acceptable product.

The blowing agent may be eliminated from the formulation if a binder is present and the drying time is controlled. When a blowing agent is not used, the packaging material is acceptable if it is not completely dried. The residual moisture within the material adds flexibility to the packaging. Although the packaging will not have an expanded, puffed configuration, the shape in which it is formed can provide good cushioning properties to the packaging. The formulation, for example, can be formed into a deeply corrugated shape resulting in spring shaped pieces when cut into individual packing peanuts. The spring shaped peanuts provide cushioning without incorporation of a blowing agent.

The amount of water present in the packaging product is dependent upon the humidity to which the product is exposed. Residual water within the product imparts flexibility.

The packaging material of the present invention is manufactured by a rolling and forming process. Cellulosic fiber, a softener, water, and, optionally, a water soluble binder are mixed to form a slurry. A blowing agent is added to the slurry to form a pulp which is formed into a shaped material. The shaped material is dried and cut into individual pieces of packaging material.

The pulp from which the packaging material is formed contains from about 4 to about 15 wt. % cellulosic fiber, from about 2 to about 8 wt. % softener, from about 0.5 to about 8.5 wt. % blowing agent, water, and, optionally, from about 0.05 to about 3 wt. % water soluble binder. Preferably, the mixture includes from about 6 to about 10 wt. % cellulosic fiber, from about 4 to about 6 wt. % softener, from about 2 to about 4 wt. % blowing agent, from about 0.25 to about 2 wt. % water soluble binder, and water. Suitable packaging material can also be formed without inclusion of the blowing agent when the water soluble binder is present. Additionally, a slurry which does not contain the water soluble binder will form a suitable packaging product if the blowing agent is included in the pulp.

The mixing time for forming the slurry is dependent upon the type of cellulosic fiber which is used. The slurry is mixed until it has a stiff consistency. A wet fiber sludge, for example, will form a stiff slurry more readily than newspaper. The mixing time required after the blowing agent is added to the slurry is preferably minimized to limit decomposition of the blowing agent prior to forming and drying. Any appropriate industrial blender can be used to form the slurry. TAPPI disintegrators or domestic mixers such as those made by Kitchen Aid are also effective for forming small amounts of the slurry.

It is expected that the pulp of the present invention can be extruded using various industrial extruders such as food processing extruders. Food processing extruders are commercially available from Werner & Pfleider, Baker & Perkins and other manufacturers. These extruders are well known in the art for the production of cheese puff snack foods.

The pulp can be formed into any desired shape. If a wave-shaped material is desired, the pulp can be formed onto a corrugated surface. The pulp can also be formed onto a drum to provide a flat sheet of packaging material. On a laboratory scale, the pulp can be formed into a desired shape by numerous methods including rolling pieces of the mixture by hand.

The pulp can also be formed into any desired thickness. The thickness of the material will, however, affect the required drying time. Formed products which approach one-half inch thickness may not be cost effective because a lengthy drying time would be required. Very thin sheets may not puff as well as thicker materials, and may not have adequate tensile strength for the shaping process if short cellulosic fibers are used.

The shaped material is dried at a temperature of from about 150° F. to about 400° F. The blowing agent will not efficiently decompose at temperatures below 150° F. which would prevent the lifting effect of the blowing agent on the packaging material. At temperatures above 400° F., the material will be scorched or will burn unless treated with flame retardant. The material is readily dried using conventional drying methods such as hot air, microwave or radiant infrared heating. In some instances it is cost effective to preliminarily dry the material in a microwave field with final drying in a hot air furnace.

The following examples are presented to describe preferred embodiments and utilities of the present invention and are not meant to limit the present invention unless otherwise stated in the claims appended hereto.

EXAMPLE 1

A biodegradable packaging material of the present invention was prepared by the following procedure. A stiff slurry was formed by combining 40 grams of wet cellulosic fiber having a consistency of 15 to 20% solids, 10 grams of a 10% polyvinyl alcohol solution available from Air Products as Airvol 125, and 5 grams glycerin available from Aldrich Chemical. The slurry was mixed in a Kitchen Aid mixer until homogeneous. 50 mL of a 17% ammonium bicarbonate (Aldrich Chemical) solution was added to the slurry and mixed until a uniform pulp was formed. The pulp was formed into a one-quarter inch thick sheet on a corrugated surface and was dried in a forced air oven at 270° F. The dried sheet was cut into individual wave shaped packaging peanuts.

The packaging peanuts were flexible, resilient, water absorbent, and were easily dispersed in hot tap water with agitation.

EXAMPLE 2

Another biodegradable packaging material of the present invention was prepared by the procedure described in Example 1. A stiff slurry was formed by combining 40 g of wet fiber having a consistency of 17% solids, 2 grams of 10% gelatin solution, 5 grams glycerin, and 35 mL water and mixing until homogeneous. 15 mL of 17% ammonium bicarbonate solution was added to the slurry and mixed until a uniform pulp resulted. The pulp was formed, dried and cut as described above.

The packaging peanuts of Example 2 were as flexible and water absorbent and as readily dispersed in hot tap water as those of Example 1. Both formulations, however, formed acceptable packaging peanuts.

While the invention is susceptible to various modifications and alternative forms, a specific embodiment thereof has been shown by way of example and has been described in detail. It should be understood, however, that it is not intended to limit the invention to the particular forms disclosed, but on the contrary, the intention is to cover all modifications, equivalents, and alternatives falling within the spirit and scope of the invention as defined by the appended claims. For example, the packaging material of the present invention may be disposed of by a consumer by soaking the material in water for an adequate period of time and agitating the water, causing the material to disperse.

We claim:

1. A biodegradable material comprising cellulosic fiber, softener, and water so as to form a packaging product, provided that the softener is not water.

2. A biodegradable material comprising cellulosic fiber, glycerin, and water so as to form a packaging product.

3. A biodegradable material comprising cellulosic fiber, glycerin, water, and a water soluble binder so as to form a packaging product.

4. The packaging material of claim 3 wherein the water soluble binder is selected from the group consisting of proteins and water soluble polymers.

5. The packaging material of claim 4 wherein the water soluble polymers are selected from the group consisting of polyvinyl alcohol, gelatin, cornstarch, polyethylene glycol and polyethylene oxide.

6. The packaging material of claim 2 including from about 40 to about 85 wt. % cellulosic fiber, from about 10 to about 50 wt. % glycerin, and from about 3 to about 20 wt. % water.

7. The packaging material of claim 2 including from about 45 to about 60 wt. % cellulosic fiber, from about 25 to about 45 wt. % glycerin, and from about 5 to about 15 wt. % water.

8. The packaging material of claim 3 including from about 40 to about 85 wt. % cellulosic fiber, from about 10 to about 50 wt. % glycerin, from about 3 to about 20 wt. % water, and from about 0.5 to about 20 wt. % water soluble binder.

9. The packaging material of claim 3 including from about 45 to about 60 wt. % cellulosic fiber, from about 25 to about 45 wt. % glycerin, from about 5 to about 15 wt. % water, and from about 1 to about 15 wt. % water soluble binder.

* * * * *